(12) United States Patent
Fei et al.

(10) Patent No.: US 10,657,367 B2
(45) Date of Patent: May 19, 2020

(54) METHODS AND SYSTEMS FOR HAND TRACKING

(71) Applicant: USENS, INC., San Jose, CA (US)

(72) Inventors: Yue Fei, San Jose, CA (US); Anli He, San Jose, CA (US); Wentao Mao, San Jose, CA (US); Gengyu Ma, San Jose, CA (US); Wenjie Mou, San Jose, CA (US); Yu Gao, San Jose, CA (US); Eunseok Park, San Jose, CA (US)

(73) Assignee: USens, Inc., San Jose, CA (US)

( * ) Notice: Subject to any disclaimer, the term of this patent is extended or adjusted under 35 U.S.C. 154(b) by 0 days.

(21) Appl. No.: 15/941,124

(22) Filed: Mar. 30, 2018

(65) Prior Publication Data

US 2018/0285636 A1 Oct. 4, 2018

Related U.S. Application Data

(60) Provisional application No. 62/481,529, filed on Apr. 4, 2017.

(51) Int. Cl.
| | |
|---|---|
| G09G 5/00 | (2006.01) |
| G06K 9/00 | (2006.01) |
| G02B 27/01 | (2006.01) |
| G06F 3/01 | (2006.01) |
| G06T 19/00 | (2011.01) |
| G02B 27/00 | (2006.01) |

(52) U.S. Cl.
CPC ....... *G06K 9/00375* (2013.01); *G02B 27/017* (2013.01); *G02B 27/0172* (2013.01); *G06F 3/011* (2013.01); *G06K 9/00355* (2013.01); *G06T 19/006* (2013.01); *G02B 27/0093* (2013.01); *G02B 2027/0138* (2013.01); *G02B 2027/0187* (2013.01)

(58) Field of Classification Search
None
See application file for complete search history.

(56) References Cited

U.S. PATENT DOCUMENTS

| 10,203,765 | B2 * | 2/2019 | He | G06F 3/017 |
|---|---|---|---|---|
| 2014/0232816 | A1 | 8/2014 | Wilson et al. | |
| 2016/0378176 | A1 | 12/2016 | Shiu et al. | |
| 2017/0061700 | A1 | 3/2017 | Urbach et al. | |
| 2018/0024641 | A1 * | 1/2018 | Mao | G06T 7/251 382/103 |
| 2018/0095542 | A1 * | 4/2018 | Mallinson | G06F 1/163 |

OTHER PUBLICATIONS

PCT International Search Report and Written Opinion dated Jun. 15, 2018, issued in International Application No. PCT/US2018/025321 (10 pages).

* cited by examiner

*Primary Examiner* — Lunyi Lao
*Assistant Examiner* — Kirk W Hermann
(74) *Attorney, Agent, or Firm* — Sheppard Mullin Richter & Hampton LLP

(57) ABSTRACT

A system for hand tracking may comprise a head mounted display wearable by a user and a hand tracking camera module attached to the head mounted display and comprising at least one of a pair of stereo cameras or a depth camera. The hand tracking camera module may be configured to capture images of at least one physical hand of the user. The head mounted display may be configured to render a virtual hand resembling the physical hand in a virtual environment for viewing by the user based at least on the images.

18 Claims, 15 Drawing Sheets

400

401: Capturing, by hand tracking camera module, images of at least one physical hand of a user 402: Rendering, by a head mounted display wearable by a user, a virtual hand resembling the physical hand in a virtual environment for viewing by the user based at least on the images, wherein the hand tracking camera module is attached to the head mounted display and comprises at least one of a pair of stereo cameras or a depth camera

501: Causing the hand tracking camera module to capture an image of at least one physical hand of a user wearing the head mounted display

502: Obtaining the image in a current frame and least one of determined skeleton joints or a determined 3D object pose in a previous frame as inputs to execute a Hand and Object Detection algorithm to determine if the physical hand holds an object in the current frame

503: In response to determining that the physical hand holds no object:

Executing a 3D Hand Skeleton Joints Recognition algorithm to determine 3D skeleton joints of the physical hand in 26 degrees-of-freedom in the current frame Causing the head mounted display to render a virtual hand resembling the physical hand in a virtual environment for viewing by the user based at least on the determined 3D skeleton joints Feedbacking the determined 3D skeleton joints to the Hand And Object Detection algorithm for determining if the physical hand holds any object in a next frame

504: In response to determining that the physical hand holds an object:

Executing a 3D Hand Skeleton Joints And Robust Object Pose Recognition algorithm to determine 3D skeleton joints of the physical hand in 26 degrees-of-freedom and a 3D object pose of the object in the current frame Causing the head mounted display to render a virtual hand resembling the physical hand in a virtual environment for viewing by the user based at least on the determined 3D skeleton joints Feedbacking the determined 3D skeleton joints and the determined 3D object pose to the Hand And Object Detection algorithm for determining if the physical hand holds any object in a next frame

505: Recursively performing (step 501) - (step 504) for the next frame

FIG. 5

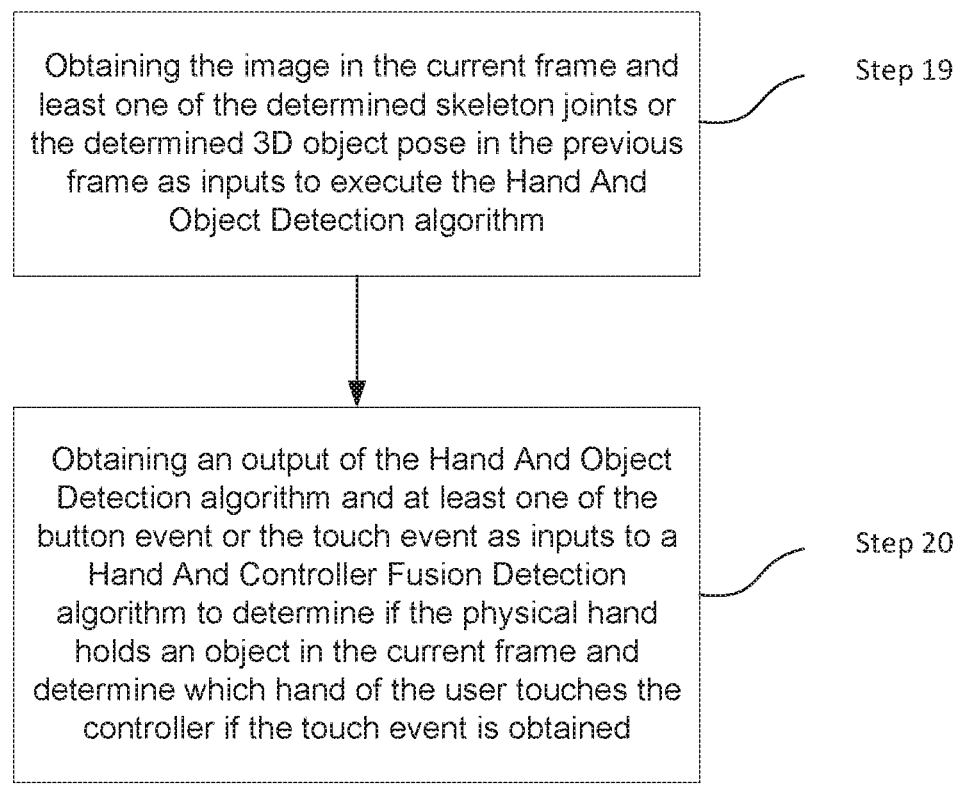

METHODS AND SYSTEMS FOR HAND TRACKING

CROSS REFERENCE TO RELATED APPLICATION

The present application is based on and claims priority to the U.S. Provisional Application No. 62/481,529, filed Apr. 4, 2017, the entire contents of which are incorporated herein by reference.

TECHNICAL FIELD

The present disclosure relates generally to methods and systems for computer vision, and more particularly, to methods and systems for hand tracking.

BACKGROUND 3D user interaction is implemented in many new computing platforms or applications, such as virtual reality (VR) and augmented reality (AR). Various methods have been proposed to render the best effect for 3D user interaction, yet many challenges are still present in the path to achieve seamless results.

SUMMARY

Various embodiments of the present disclosure can include systems, methods, and non-transitory computer readable media for hand tracking. According to one aspect, a system for hand tracking may comprise a head mounted display wearable by a user and a hand tracking camera module attached to the head mounted display and comprising at least one of a pair of stereo cameras or a depth camera. The hand tracking camera module may be configured to capture images of at least one physical hand of the user. The head mounted display may be configured to render a virtual hand resembling the physical hand in a virtual environment for viewing by the user based at least on the images.

According to another aspect, a method for hand tracking may comprise: capturing, by hand tracking camera module, images of at least one physical hand of a user; and rendering, by a head mounted display wearable by a user, a virtual hand resembling the physical hand in a virtual environment for viewing by the user based at least on the images. The hand tracking camera module is attached to the head mounted display and comprises at least one of a pair of stereo cameras or a depth camera.

According to another aspect, an apparatus for hand tracking may comprise: a head mounted display, a hand tracking camera module attached to the head mounted display and comprising at least one of a pair of stereo cameras or a depth camera, a processor, and a non-transitory computer-readable storage medium storing instructions that, when executed by the processor, cause the processor to perform a method. The method may comprise: (step 14) causing the hand tracking camera module to capture an image of at least one physical hand of a user wearing the head mounted display; (step 15) obtaining the image in a current frame and least one of determined skeleton joints or a determined 3D object pose in a previous frame as inputs to execute a Hand and Object Detection algorithm to determine if the physical hand holds an object in the current frame; (step 16) in response to determining that the physical hand holds no object: executing a 3D Hand Skeleton Joints Recognition algorithm to determine 3D skeleton joints of the physical hand in 26 degrees-of-freedom in the current frame, causing the head mounted display to render a virtual hand resembling the physical hand in a virtual environment for viewing by the user based at least on the determined 3D skeleton joints, and feedbacking the determined 3D skeleton joints to the Hand And Object Detection algorithm for determining if the physical hand holds any object in a next frame; (step 17) in response to determining that the physical hand holds an object: executing a 3D Hand Skeleton Joints And Robust Object Pose Recognition algorithm to determine 3D skeleton joints of the physical hand in 26 degrees-of-freedom and a 3D object pose of the object in the current frame, causing the head mounted display to render a virtual hand resembling the physical hand in a virtual environment for viewing by the user based at least on the determined 3D skeleton joints, and feedbacking the determined 3D skeleton joints and the determined 3D object pose to the Hand And Object Detection algorithm for determining if the physical hand holds any object in a next frame; and (step 18) recursively performing (step 14)-(step 17) for the next frame.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

The accompanying drawings, which constitute a part of this disclosure, illustrate several embodiments and, together with the description, serve to explain the disclosed principles.

FIG. 4 is a flow diagram illustrating an exemplary method for hand tracking, consistent with exemplary embodiments of the present disclosure.

FIG. 5 is a flow diagram illustrating an exemplary method for hand tracking, consistent with exemplary embodiments of the present disclosure.

FIG. 11 is a flow diagram illustrating an exemplary method for hand tracking, consistent with exemplary embodiments of the present disclosure.

DETAILED DESCRIPTION

Figure 1A:
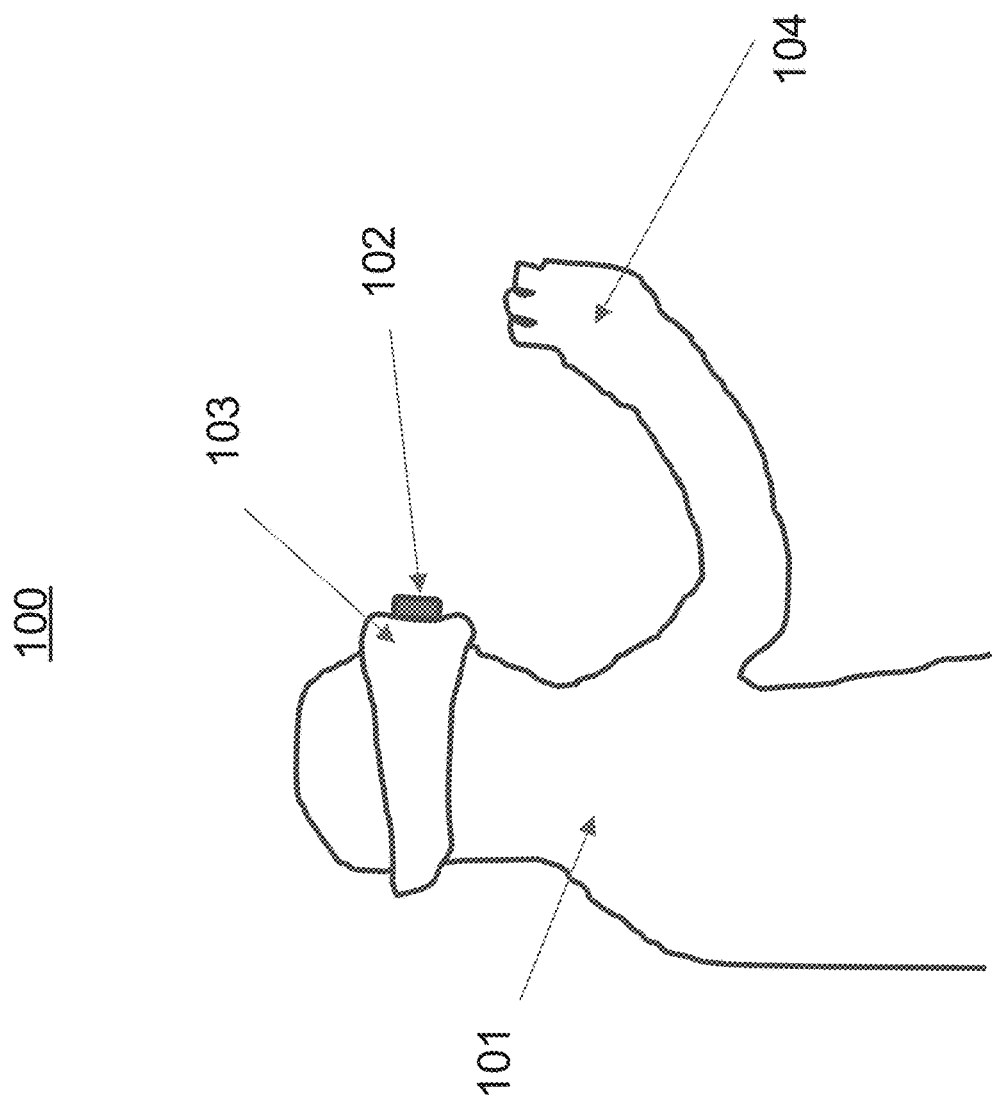
FIG. 1A illustrates an exemplary environment for hand tracking, in accordance with various embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Current technologies for hand tracking in 3D user interaction applications are ineffective and have various limitations. Typical conventional approaches include hand-held controller-based user interaction (e.g., based on hand-held controllers), wearable-device-based user interaction (e.g., based on data gloves), and computer-vision-based free-hand user interaction. First, the current hand-held controllers include two types: (1) controllers that track 3D rotation only (3 degrees of freedom, i.e., 3DOF), such as Google Daydream™ controller, based on internal IMUs (inertial measurement unit), (2) controllers that track 3D rotation and 3D position (6DOF), such Oculus Touch™ and HTC Vive™ controller, based on internal IMUs and external camera or external light emitters. However, neither of the two approaches can track all fingers' motion, and in both cases, the users are forced to hold the controller with their hands. Therefore, the user experience becomes unnatural for having to "grab" onto the controller. Second, the current wearable-device-based controllers include data gloves, which use multiple IMU sensors and bend sensors in the gloves to detect finger movement. However, the data gloves lack absolute 6DOF tracking of the hand, require complicated calibration, and cannot track finger motions in high precision. Third, the current computer-vision-based free-hand user interaction have no tactile feedback, is unable to detect actions with very high accuracy (e.g., when hands are in grab gestures, when 6DOF tracking is required).

A claimed solution rooted in computer technology can overcome the problems set forth above in the current technologies to enable high accuracy hand tracking and obviate complicated external hardware setup and calibration in existing technologies. In the context of this disclosure, hand tracking may include finger tracking. In various embodiments, the disclosed systems and methods can track detailed actions of all fingers in natural hand gestures without forcing "constant grabbing." Highly accurate tracking of 3D position and 3D rotation of hands can be achieved for various actions (e.g., click, grab, etc.) by executing computer-vision-based algorithms on camera inputs and/or executing fusion algorithms on the camera inputs and active feedback (e.g., controller feedback) to confirm the action. That is, computer-vision-based hand tracking may be implemented with or without peripheral devices (e.g., glove, palm band, joystick, gun-shape object, etc.) for providing the active feedback. For 3D interactive applications (e.g., VR, AR, etc.) enabled by the disclosed system or method, a user can participate in various interactions (e.g., interaction with a virtual object or environment) with her hands in at least one of the following modes: (1) free-hand interaction via computer-vision-based hand tracking, (2) participate in interaction with one hand free and the other hand holding or wearing a peripheral device, or (3) participate in interaction with both hands holding or wearing a peripheral device. The user may also smoothly and transparently switch among the three interaction modes without resetting or configuring the system. The disclosed systems can directly track 6DOF pose information (3D rotation and 3D position) of each hand (e.g., with respect to wrist, with respect to palm, etc.) by computer vision, directly track 26DOF hand skeleton pose information for each hand by computer vision, and/or track the peripheral device's 6DOF pose information by various sensors for confirming the hand's 6DOF and 26DOF pose information. The 26DOF pose information represents a total number of degrees of freedom of all finger joints of each hand. The 26DOF pose information may include the pose (position and rotation) of each joint of the hand. A detailed illustration of the 26DOF can be found in U.S. Pat. Pub. No. 20180024641A1, titled "Method and system for 3d hand skeleton tracking," which is incorporated herein by reference. With respect to the peripheral devices, for example, IMUs embedded in the peripheral devices can capture motion data to help improve the accuracy of the 6DOF pose information of the hand determined by computer vision.

In various embodiments, the disclosed systems and methods are enabled by various algorithms described herein. The algorithms can be implemented as software algorithms or a combination of software algorithms and hardware components. For example, some algorithm execution may cause sensors to capture sensor data and cause a processor to process the sensor data.

FIG. 1A illustrates an exemplary environment 100 for hand tracking, in accordance with various embodiments. The description of FIG. 1A is intended to be illustrative and may be modified in various ways according to the implementation. As shown in FIG. 1A, the environment 100 may comprise a 3D hand tracking camera module 102 (e.g., stereo IR cameras or one depth camera) mountable on a head mounted display (HMD) 103. The hand tracking camera module 102 may attach to or detach from the HMD 103, as long as they are communicatively coupled. The HMD 103 may be worn by a user 101 in a real physical environment on her head and positioned for viewing by her eyes. The HMD 103 can render a virtual environment. The user 101 may view and perceive the rendered virtual environment as if seeing a real physical environment. The user 101 can use her hand 104 for performing various interactions with (1) virtual objects in the rendered virtual environment and/or (2) real physical objects in the real physical environment. In either case, the hand tracking camera module 102 can capture the hand motion (and the real physical objects, if present) and work with the HMD 103 to recreate the hand motion (and the real physical objects, if present) in the rendered virtual environment as if a real physical hand interacting with real physical objects in a real physical environment. To this end, the hand tracking camera module 102 and/or the HMD 103 may implement various algorithms (e.g., 3D computer vision and machine learning-based algorithms). The computer vision and machine learning-based algorithms can be stored anywhere in the hand tracking system (e.g., in the HMD 103, in the hand tracking camera module 102, in a cloud device coupled to the HMD 103 or the hand tracking camera module 102, etc.), and can process camera-captured images, interpret hand movement from the images, and create hand interactions with virtual objects in the virtual environment. For this disclosure, the user 101's both hands or only one hand may: (1) be free of any object (bare-handed), (2) hold an object with no active feedback, or (3) hold a peripheral device with active feedback. Various configurations for hand 104 is described below with reference to FIG. 1B.

Figure 1B:
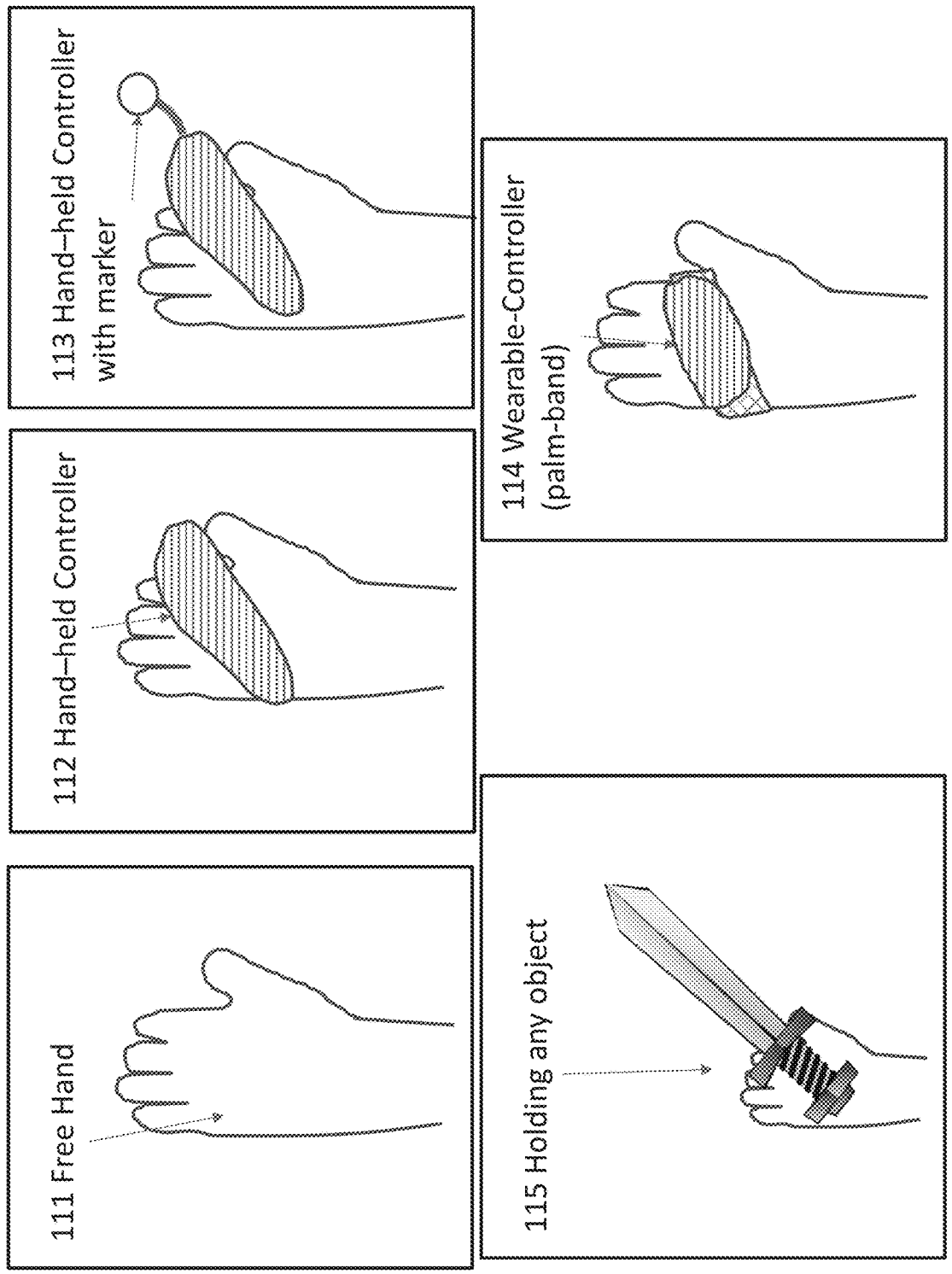
FIG. 1B illustrates various hand configurations for hand tracking, in accordance with various embodiments.

FIG. 1B illustrates various hand configurations of hand 104 for hand tracking, in accordance with various embodiments. The description of FIG. 1B is intended to be illustrative and may be modified in various ways according to the implementation. As shown in FIG. 1B, the hand configurations may include: free-hand 111 (bare-handed), holding a controller 112 with active feedback (e.g., with a button, a touch sensor, and/or a motion sensor such as IMU), holding a controller 113 with active feedback (e.g., with a button or a touch sensor, a motion sensor such as IMU, and a marker), or wearing an controller 114 (e.g., palm band), or holding an object 115 with no active feedback. For the controller 113, the marker may be trackable by the hand tracking camera module 102 and/or the HMD 103. For example, the marker can comprise an active light emitter. The light emitter may emit infrared light to be detected by a detector comprised in the hand tracking camera module 102 or the HMD 103. For another example, the marker can comprise a light reflector configured to be lit up by a light emitter comprised in the hand tracking camera module 102 or the HMD 103. The marker may have spherical or alternative shapes. For the wearable controller 114, the palm band can be easily put on and take off, and do not drop when the user releases her hand. Alternatively, the user can use various other devices such as conventional controllers, gloves, toys, etc. In various embodiments, the peripheral devices may comprise the controllers in configurations 112, 113, and 114, and may not comprise the object in configuration 115.

In various embodiments, a system for hand tracking may comprise a head mounted display wearable by a user and a hand tracking camera module attached to the head mounted display and comprising at least one of a pair of stereo cameras or a depth camera. The hand tracking camera module may be configured to capture images of at least one physical hand of the user. The head mounted display may be configured to render a virtual hand resembling the physical hand in a virtual environment for viewing by the user based at least on the images. Optionally, the system may comprise a controller. The configurations of the head mounted display, the hand tracking camera module, and the controller are described below with reference to FIG. 2A and FIG. 2B.

Figure 2A:
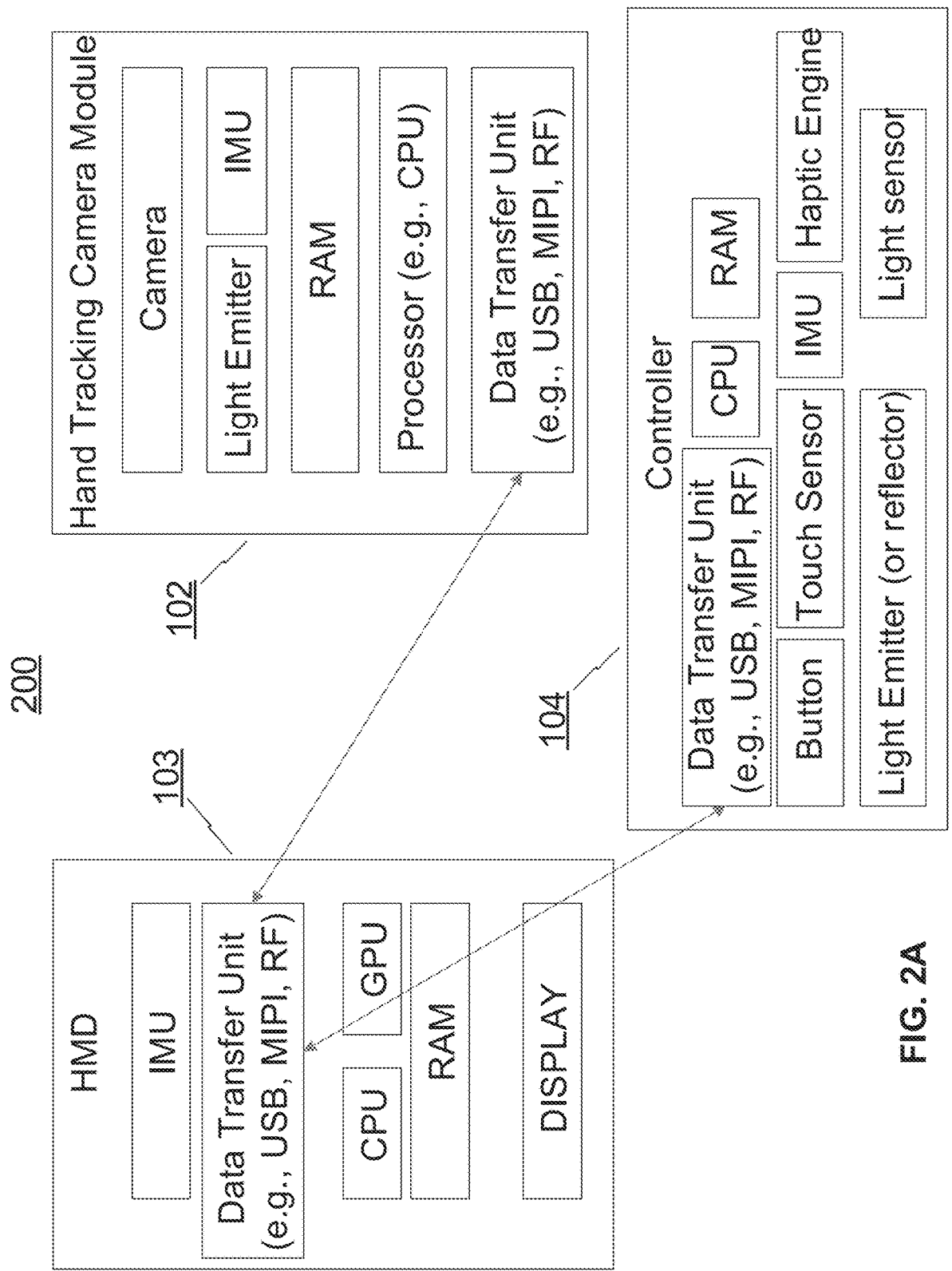
FIG. 2A illustrates an exemplary system for hand tracking, in accordance with various embodiments.

FIG. 2A illustrates an exemplary system 200 for hand tracking with vision processor on HMD, in accordance with various embodiments. The description of FIG. 2A is intended to be illustrative and may be modified in various ways according to the implementation. Some of the components shown are optional. As shown in FIG. 2A, the HMD 103 may include one or more of: an IMU, a data transfer unit (e.g., USB (Universal Serial Bus), MIPI (Mobility Industry Processor Interface), RF (Radio Frequency Module), etc.), a processor (e.g., CPU (Central Processing Unit), GPU (Graphics Processing Unit), vision processing unit, etc.), a memory (e.g., RAM), and a display (e.g., liquid crystal display) coupled to one another. The IMU may be configured to sense 3DOF rotation of the HMD 103. The memory may be configured to store various algorithms as instructions. The processor may be configured to execute the various algorithms. The display may be configured to show the virtual environment.

In some embodiments, the hand tracking camera module 102 may include one or more of: a camera (e.g., stereo camera, depth camera, etc.), a light emitter, an IMU, a memory (e.g., RAM), a processor (e.g., CPU, etc.), and a data transfer unit (e.g., USB, MIPI, RF, etc.) coupled to one another. The hand tracking camera module 102 may comprise one or more RGB (red-green-blue) cameras, one or more depth cameras, one or more IR cameras, or a combination thereof (e.g., RGB-IR cameras, RGB-depth cameras, etc.). The cameras may capture RGB information, IR information, and/or depth information of an object. For example, IR radiations emitted from an object or IR radiations received from an emitting diodes and consequently reflected from an object may be captured by the IR cameras. The RGB and depth information may have an image or video format. In some embodiments, the hand tracking camera module 102 may comprise at least one of a pair of stereo (infrared) cameras or a depth camera. The hand tracking camera module 102 may capture frames of images and depth information associated with each pixel in each frame. The light emitter may be configured to emit light to be reflected by a reflector on the controller 104 as marker. The IMU may be configured to sense 3DOF rotation of the hand tracking camera module 102. The memory may be configured to store various algorithms as instructions. The processor may be configured to execute the various algorithms.

In some embodiments, the controller 104 may be held or worn by the user's physical hand and may have various configurations such as glove, stick, joystick, palm band, etc. The controller 104 may include one of more of: a data transfer unit (e.g., USB, MIPI, RF, etc.), a processor (e.g., CPU, etc.), a memory (e.g., RAM), one or more buttons, one or more touch sensors, an IMU, a haptic engine (e.g., motor, vibrator), a light emitter (or reflector), and a light sensor coupled to one another. In some embodiments, the IMU may be configured to sense 3DOF rotation of the controller 104. The button may be configured to sense a button event to provide as active feedback to the head mounted display, the button event comprising pressing the button. The touch sensor may be configured to sense a touch event as active feedback to the head mounted display, the touch event comprising touching the touch sensor. The light sensor may be configured to sense light to mark the controller 104. The haptic engine (e.g., motors, vibrators) may be configured to create a sense of touching by creating a mechanical response to a touch action. The memory may be configured to store various algorithms as instructions. The processor may be configured to execute the various algorithms.

In some embodiments, the data transfer unit of the HMD 103 may communicate and transfer data with the data transfer unit of the hand tracking camera module 102 and with the data transfer unit of the controller 104 (e.g., via Bluetooth, WiFi, custom 2.4G, etc.). The memories of the hand tracking camera module 102, the HMD 103, and the controller 104 may each be a non-transitory computer-readable storage medium storing instructions that, when executed by the corresponding processor, causing the processor to perform the corresponding method(s)/step(s) described below with reference to FIG. 3A and FIG. 6 to FIGS. 9A-9B.

Figure 2B:
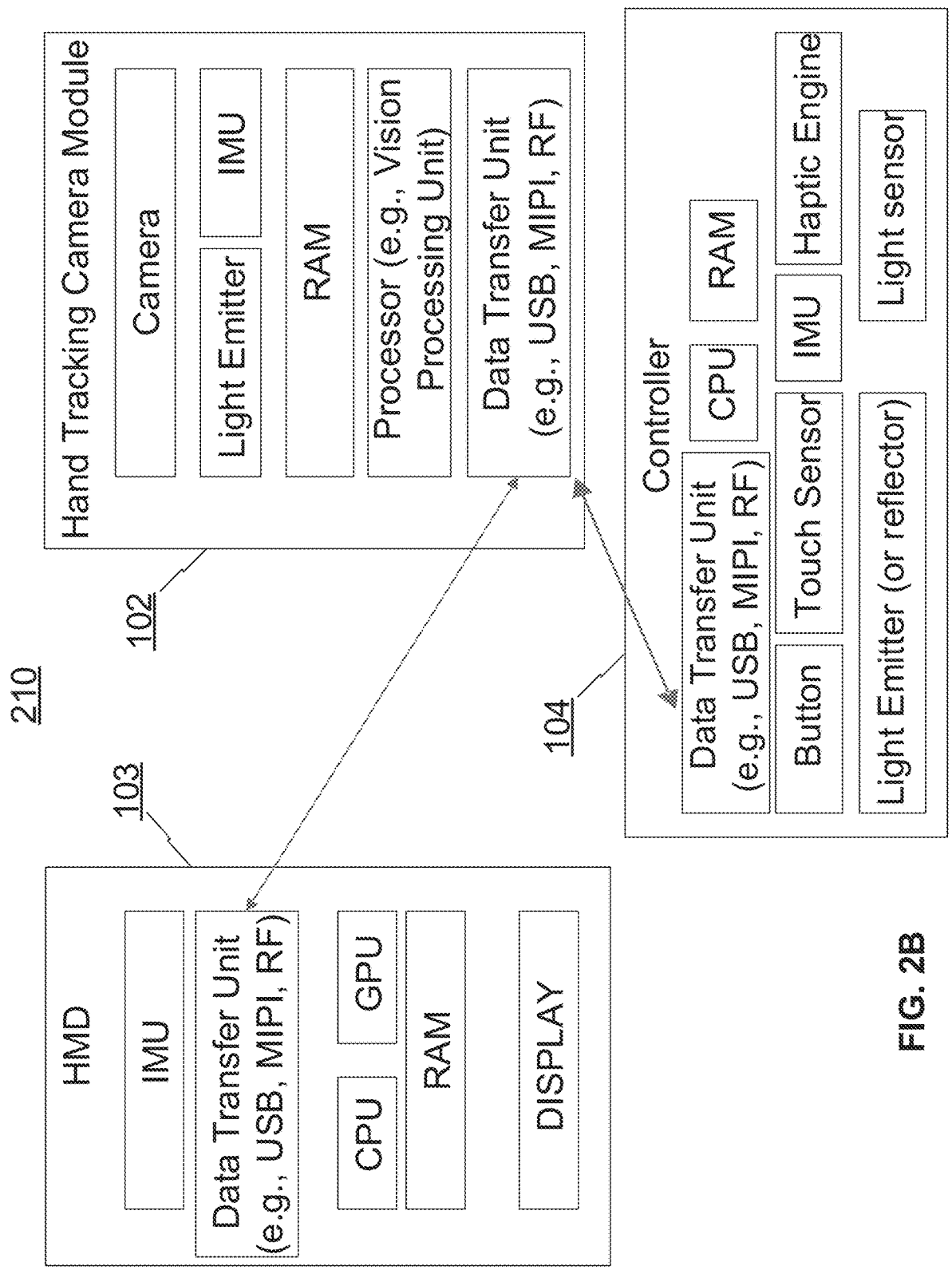
FIG. 2B illustrates an exemplary system for hand tracking, in accordance with various embodiments.

FIG. 2B illustrates an exemplary system 210 for hand tracking with vision processor on camera, in accordance with various embodiments. The description of FIG. 2B is intended to be illustrative and may be modified in various ways according to the implementation. Some of the components shown are optional. As shown in FIG. 2B, the system 210 may comprise the HMD 103, the hand tracking camera module 102, and the controller 104 similar to those described above in FIG. 2A. Here, the processor of the hand tracking camera module 102 may comprise, for example, a vision processing unit. In some embodiments, the data transfer unit of the hand tracking camera module 102 may communicate and transfer data with the data transfer unit of the HMD 103 and with the data transfer unit of the controller 104 (e.g., via Bluetooth, WiFi, custom 2.4G, etc.). The memories of the hand tracking camera module 102, the HMD 103, and the controller 104 may each be a non-transitory computer-readable storage medium storing instructions that, when executed by the corresponding processor, causing the processor to perform the corresponding method(s)/step(s) described below with reference to FIG. 3B and FIG. 6 to FIGS. 9A-9B.

Figure 3A:
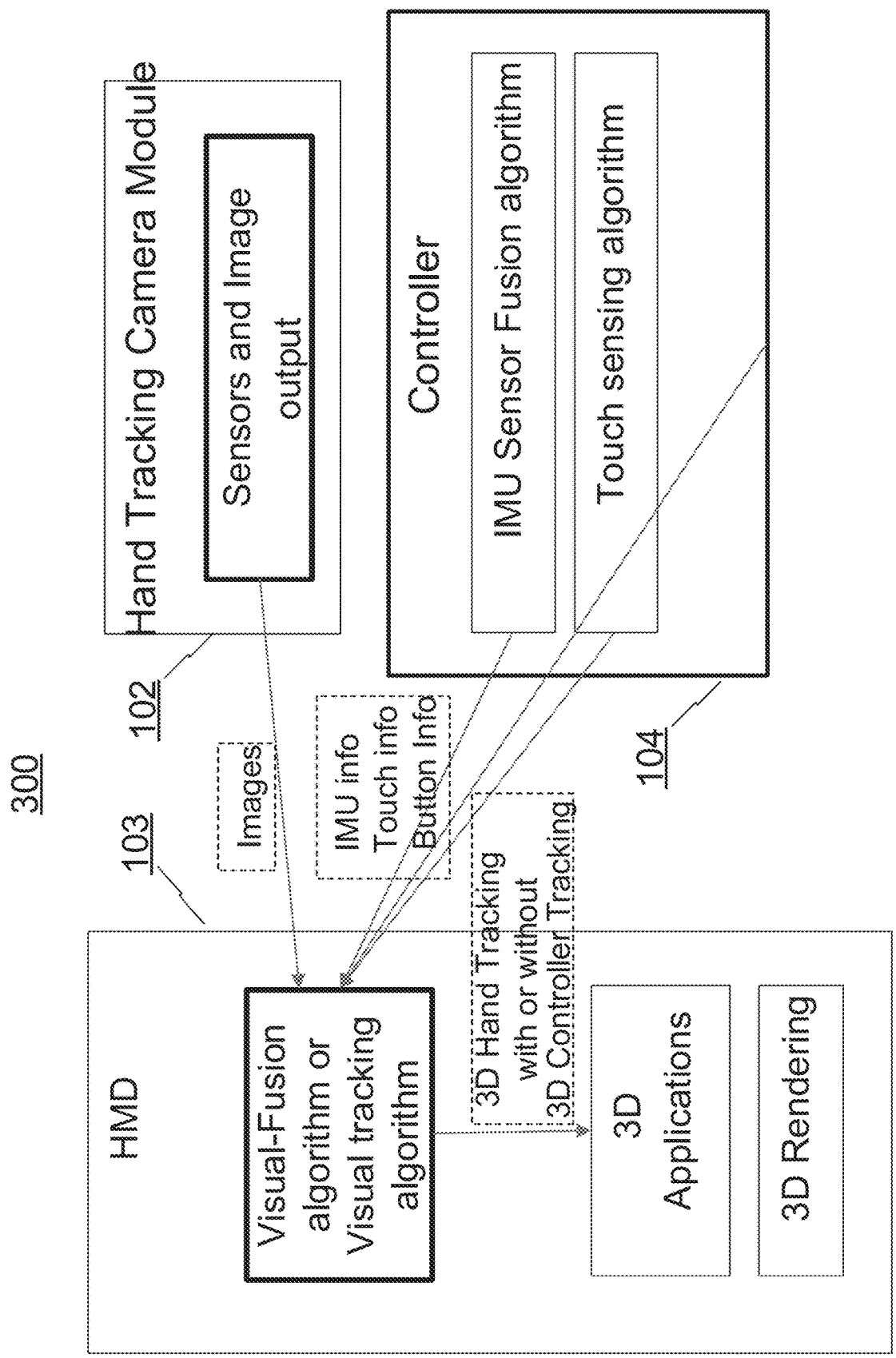
FIG. 3A illustrates an exemplary interaction among the system for hand tracking, in accordance with various embodiments.

FIG. 3A illustrates an exemplary interaction 300 among the system 200 for hand tracking, in accordance with various embodiments. The description of FIG. 3A is intended to be illustrative and may be modified in various ways according to the implementation. As shown in FIG. 3A, the hand tracking camera module 102 may capture images (e.g., hand images) and transmit the captured images and/or other sensor output (e.g., IMU data) to the HMD 103. The memory of the controller 104 may store an IMU Sensor Fusion algorithm (for capturing and configuring IMU sensing data) and/or a Touch Sensing algorithm (for capturing and configuring touch sensing data) as instructions that, when executed by the processor of the controller 104, cause the processor to obtain and transmit IMU information, touch information, and/or button information to the HMD 103. The memory of the HMD 103 may store a Visual-Fusion algorithm as instructions that, when executed by the processor of the HMD 103, cause the processor to perform various methods/steps described below with reference to FIG. 7 to FIGS. 9A-9B.

In some embodiments, the controller 104 is not included in the system 300, and the memory of the HMD 103 may store a Visual Tracking algorithm as instructions that, when executed by the processor of the HMD 103, cause the processor to perform various methods/steps described below with reference to FIG. 6. With either the Visual-Fusion algorithm or the Visual Tracking algorithm, the HMD 103 may process the received images and information to effectuate 3D hand tracking (with or without refinement based on 3D controller tracking), which can be used for implementing various 3D applications and/or 3D rendering (e.g., rendering the virtual environment and the virtual hand).

Figure 3B:
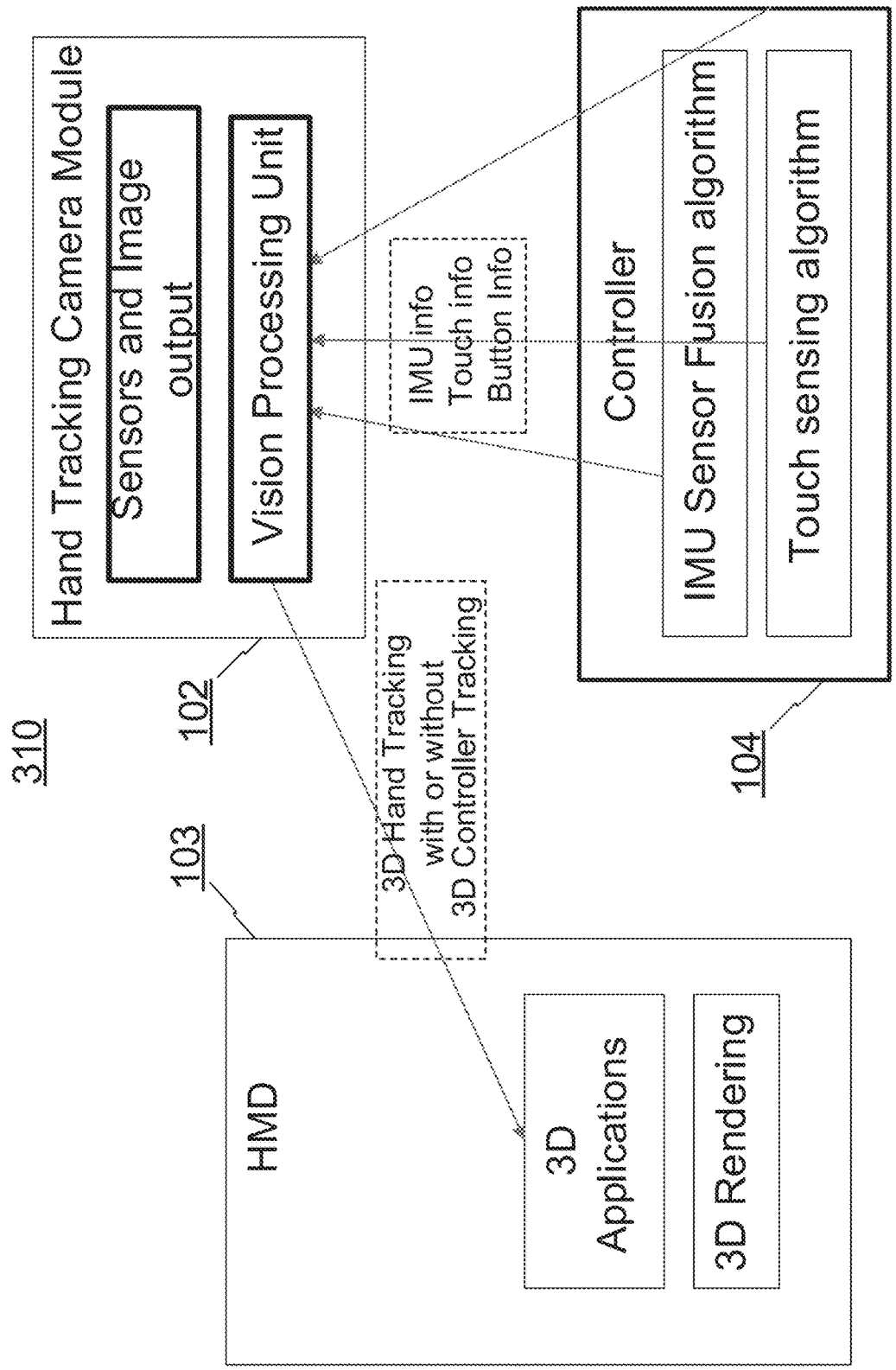
FIG. 3B illustrates an exemplary interaction among the system for hand tracking, in accordance with various embodiments.

FIG. 3B illustrates an exemplary interaction 310 among the system 210 for hand tracking, in accordance with various embodiments. The description of FIG. 3B is intended to be illustrative and may be modified in various ways according to the implementation. As shown in FIG. 3B, the memory of the controller 104 may store an IMU Sensor Fusion algorithm (for capturing and configuring IMU sensing data) and/or a Touch Sensing algorithm (for capturing and configuring touch sensing data) as instructions that, when executed by the processor of the controller 104, cause the processor to obtain and transmit IMU information, touch information, and/or button information to the hand tracking camera module 102. The hand tracking camera module 102 may capture images (e.g., hand images) and/or other sensor output (e.g., IMU data). The memory of the hand tracking camera module 102 may store a Visual-Fusion algorithm as instructions that, when executed by the processor of the hand tracking camera module 102, cause the processor to perform various methods/steps described below with reference to FIG. 7 to FIGS. 9A-9B.

In some embodiments, the controller 104 is not included in the system 310, and the memory of the hand tracking camera module 102 may store a Visual Tracking algorithm as instructions that, when executed by the processor of the hand tracking camera module 102, cause the processor to perform various methods/steps described below with reference to FIG. 6. With either the Visual-Fusion algorithm or the Visual Tracking algorithm, the hand tracking camera module 102 may process the captured images and information to effectuate 3D hand tracking (with or without refinement based on 3D controller tracking). The 3D tracking results can be transmitted to the HMD 103 for implementing various 3D applications and/or 3D rendering (e.g., rendering the virtual environment and the virtual hand).

As such, regardless of the disposition of the vision processor (e.g., in the HMD 103 as shown in FIG. 2A and FIG. 3A, or in the hand tracking camera module 102 as shown in FIG. 2B and FIG. 3B), in some embodiments, when a user uses a bare hand for hand tracking, the disclosed systems can track the hand's 26DOF motion based on camera inputs to create the virtual interaction for the user. If the user desires for more accurate tracking of the 3D rotation and 3D position of the hand, a broader tracking range (e.g., when the hand is out of the hand tracking camera's field of view coverage), more accurate detection of some actions (e.g., grabbing, etc.), or haptic feedback feelings, the user can use a peripheral device that provides 3D rotational information, such as a 3D controller. In such case, the peripheral device can send 3D rotation information (e.g., from the IMU in the peripheral device) and button or touch sensing information to help refine the hand tracking obtained from camera inputs. Accordingly, a Visual-Fusion algorithm may (1) calculate new 3D rotation and 3D position information of the hand and the controller by combining 26DOF hand tracking information and 3D information received from the peripheral device, and (2) detect if the hand is holding the device and which hand is holding which device.

Thus, with the disclosed systems, a user's 6DOF (3D rotation+3D position) action in a real physical environment can be captured and recreated in real time in a virtual environment regardless whether the user holds or wears an external device. That is, even devices that only support 3D rotation or that do not have any active feedback capability can be used to achieve the 6DOF interaction. In the case that the device does not have any active feedback capability, all movement of the device can be estimated based on vision-based hand tracking.

FIG. 4 is a flow diagram illustrating an exemplary method 400 for hand tracking, consistent with exemplary embodiments of the present disclosure. The method 400 may be implemented by the systems described herein. The method 400 includes a number of steps, some of which may be optional.

Step 401 may include capturing, by hand tracking camera module, images of at least one physical hand of a user. Step 402 may include rendering, by a head mounted display wearable by a user, a virtual hand resembling the physical hand in a virtual environment for viewing by the user based at least on the images, wherein the hand tracking camera module is attached to the head mounted display and comprises at least one of a pair of stereo cameras or a depth camera. The hand tracking camera module and the head mounted display are described above. The details for rendering the virtual hand are described with reference to various algorithms in FIG. 6 to FIGS. 9A-9B.

FIG. 5 is a flow diagram illustrating an exemplary method 500 for hand tracking, consistent with exemplary embodiments of the present disclosure. The method 500 may be implemented by the systems described herein. The method 500 includes a number of steps, some of which may be optional. In some embodiments, the method 500 can be implemented by an apparatus for hand tracking. The apparatus may comprise the head mounted display 103, the hand tracking camera module 102 attached to the head mounted display 103 (or detached from and communicatively coupled to the head mounted display 103) and comprising at least one of a pair of stereo cameras or a depth camera, a processor, and a non-transitory computer-readable storage medium storing instructions that, when executed by the processor, cause the processor to perform the method 500. The processor and the storage medium can be disposed anywhere in the apparatus, within or outside the head mounted display 103 or the hand tracking camera module 102.

The method 500 may comprise: (block 501) causing the hand tracking camera module to capture an image of at least one physical hand of a user wearing the head mounted display, (block 502) obtaining the image in a current frame and least one of determined skeleton joints or a determined 3D object pose in a previous frame as inputs to execute a Hand and Object Detection algorithm to determine if the physical hand holds an object in the current frame; (block 503) in response to determining that the physical hand holds no object: executing a 3D Hand Skeleton Joints Recognition algorithm to determine 3D skeleton joints of the physical hand in 26 degrees-of-freedom in the current frame, causing the head mounted display to render a virtual hand resembling the physical hand in a virtual environment for viewing by the user based at least on the determined 3D skeleton joints, and feedbacking the determined 3D skeleton joints to the Hand And Object Detection algorithm for determining if the physical hand holds any object in a next frame; (block 504) in response to determining that the physical hand holds an object: executing a 3D Hand Skeleton Joints And Robust Object Pose Recognition algorithm to determine 3D skeleton joints of the physical hand in 26 degrees-of-freedom and a 3D object pose of the object in the current frame, causing the head mounted display to render a virtual hand resembling the physical hand in a virtual environment for viewing by the user based at least on the determined 3D skeleton joints, and feedbacking the determined 3D skeleton joints and the determined 3D object pose to the Hand And Object Detection algorithm for determining if the physical hand holds any object in a next frame; and (block 505) recursively performing (step 501)-(step 504) for the next frame.

Further details of the method 500 are discussed below with reference to FIG. 6. The Hand and Object Detection algorithm, the 3D Hand Skeleton Joints Recognition algorithm, and similar algorithms for recognizing and tracking hands, hand joints, and objects held or worn by the hands can be found in U.S. Pat. Pub. No. 20180024641A1, titled "Method and system for 3d hand skeleton tracking" and U.S. Pat. Pub. No. 20180025540A1, titled "Methods and systems for 3d contour recognition and 3d mesh generation," the entire contents of all of which are incorporated herein by reference. The 3D Hand Skeleton Joints And Robust Object Pose Recognition algorithm, and similar algorithms for recognizing and tracking hand joints and object poses can be found in U.S. Pat. Pub. No. 20180046874A1, titled "Method and system for 3d hand skeleton tracking" and U.S. Pat. Pub. No. 20180025540A1, titled "System and method for marker based tracking," the entire contents of all of which are incorporated herein by reference.

In some embodiments, the apparatus may further comprise a controller held or worn by the physical hand. The controller comprises at least one of a button or a touch sensor. The button is configured to sense a button event to provide as active feedback to the head mounted display, the button event comprising pressing the button. The touch sensor is configured to sense a touch event as active feedback to the head mounted display, the touch event comprising touching the touch sensor. In this case the block 502 comprises: obtaining the image in the current frame and least one of the determined skeleton joints or the determined 3D object pose in the previous frame as inputs to execute the Hand And Object Detection algorithm, and obtaining an output of the Hand And Object Detection algorithm and at least one of the button event or the touch event as inputs to a Hand And Controller Fusion Detection algorithm to determine if the physical hand holds an object in the current frame and determine which hand of the user touches the controller if the touch event is obtained. Further details of the method 500 are discussed below with reference to FIG. 7.

The Hand And Controller Fusion Detection algorithm, and similar algorithms for recognizing and tracking hand and controller can be found in U.S. Pat. Pub. No. 20180025540A1, titled "System and method for marker based tracking," the entire contents of which are incorporated herein by reference.

Figure 6:
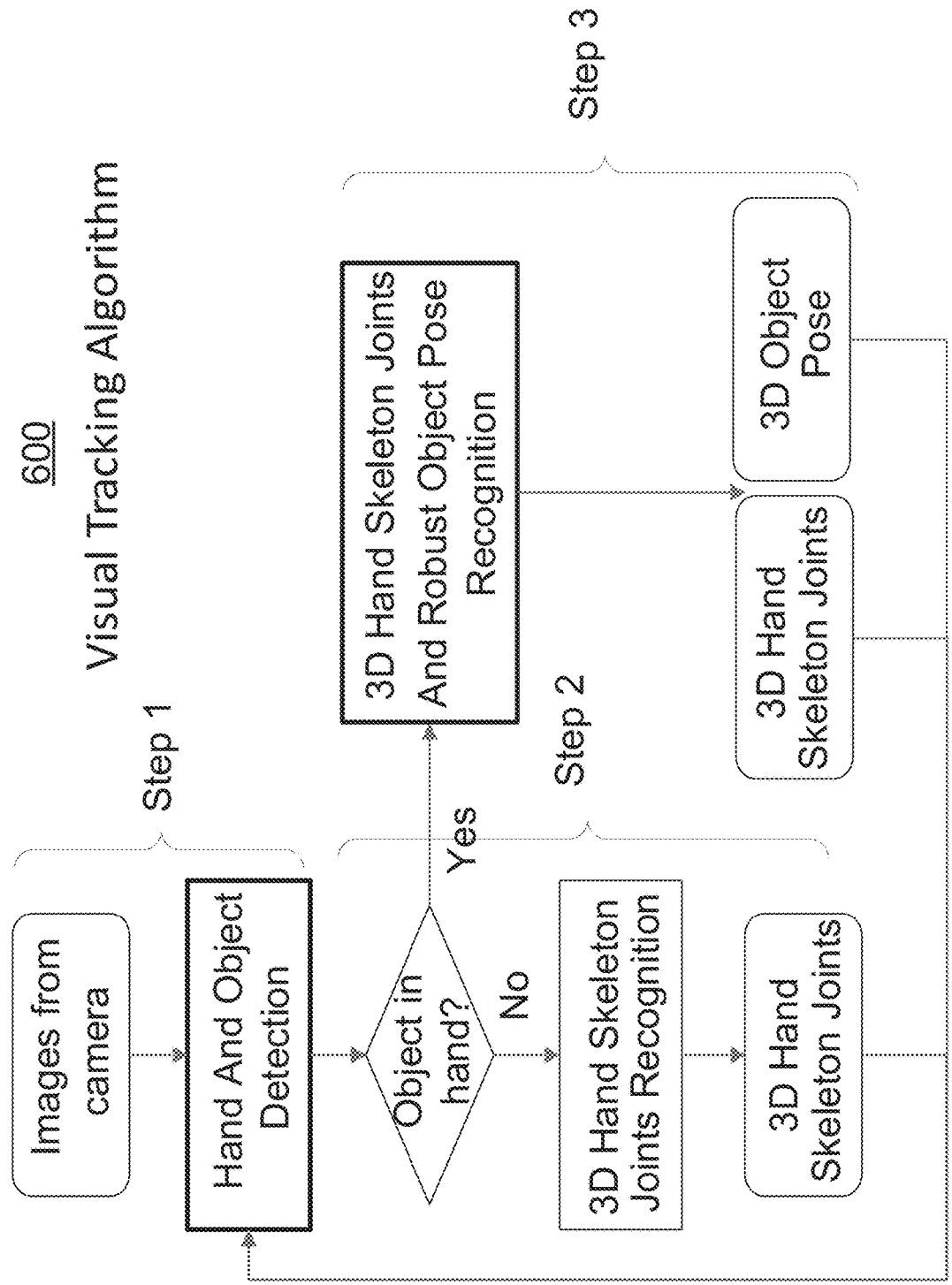
FIG. 6 is a flow diagram illustrating an exemplary method for hand tracking, consistent with exemplary embodiments of the present disclosure.

FIG. 6 is a flow diagram illustrating an exemplary method 600 for hand tracking, consistent with exemplary embodiments of the present disclosure. The method 600 may be implemented by the systems described herein. The method 600 includes a number of steps, some of which may be optional. The method 600 may be referred to as a Visual Tracking algorithm. The method 600 may be applicable to the hand configurations 111 and 115 of FIG. 1B. In some embodiments, the user 101 may bare-handedly interact with the virtual environment or grab or hold a physical object (e.g., a sword) with the user's hand to interact with the virtual environment rendered by the HMD 103. Unlike the buttons and motion sensors that can provide active feedback, the object here may be incapable of providing active feedback to the system 200 and 210. If the physical object is present, the HMD 103 may be further configured to render a virtual object resembling the physical object, the virtual object held by the virtual hand in the virtual environment. In one example, when the hand holds a sword, the sword may be detected by a computer vision algorithm and rendered to interest with virtual objects in a virtual environment, and when the user drops the sword, the user can interact with the virtual objects in the virtual environment with empty hands. The grabbed virtual 3D object can move in the virtual environment according to how the user moves her hand in the real physical world.

As shown in FIG. 6, to render the virtual hand resembling the physical hand in the virtual environment for viewing by the user based at least on the images, the system 200/210 may comprise a processor and a non-transitory computer-readable storage medium storing instructions that, when executed by the processor, cause the processor to perform the method 600. The processor and the non-transitory computer-readable storage medium may be comprised in the HMD 103 or in the hand tracking camera module 102. The method 600 may comprise (step 1) obtaining an image in a current frame and least one of determined skeleton joints or a determined 3D object pose in a previous frame as inputs to execute a Hand and Object Detection algorithm to determine if the physical hand holds an object in the current frame. The method 600 may further comprise (step 2) in response to determining that the physical hand holds no object: executing a 3D Hand Skeleton Joints Recognition algorithm to determine 3D skeleton joints of the physical hand in 26 degrees-of-freedom in the current frame, rendering the virtual hand based at least on the determined 3D skeleton joints, and feedbacking the determined 3D skeleton joints to the Hand And Object Detection algorithm for determining if the physical hand holds any object in a next frame. The method 600 may further comprise (step 3) in response to determining that the physical hand holds an object: executing a 3D Hand Skeleton Joints And Robust Object Pose Recognition algorithm to determine 3D skeleton joints of the physical hand in 26 degrees-of-freedom and a 3D object pose of the object in the current frame, rendering the virtual hand based at least on the determined 3D skeleton joints, and feedbacking the determined 3D skeleton joints and the determined 3D object pose to the Hand And Object Detection algorithm for determining if the physical hand holds any object in a next frame. The method 600 may further comprise (step 4 (not shown in FIG. 6)) recursively performing (step 1)-(step 3) for the next frame.

In some embodiments, the Hand And Object Detection algorithm can detect in the image, for each of the left hand and right hand, (1) if the hand is free of any object, (2) if there is an object in the hand, and (3) the object. Based on if the hand is free-moving or holding an object, different hand skeleton recognition algorithms can be executed. The different hand skeleton recognition algorithms may include an algorithm optimized for the case of free-hand (e.g., the 3D Hand Skeleton Joints Recognition algorithm) to output accurate hand 3D skeleton information, and an algorithm optimized for the case of hand-held-object (e.g., the 3D Hand Skeleton Joints And Robust Object Pose Recognition algorithm) to output more accurate pose (3D rotation and 3D position) of the object held in the hand and output hand 3D skeleton information.

Figure 7:
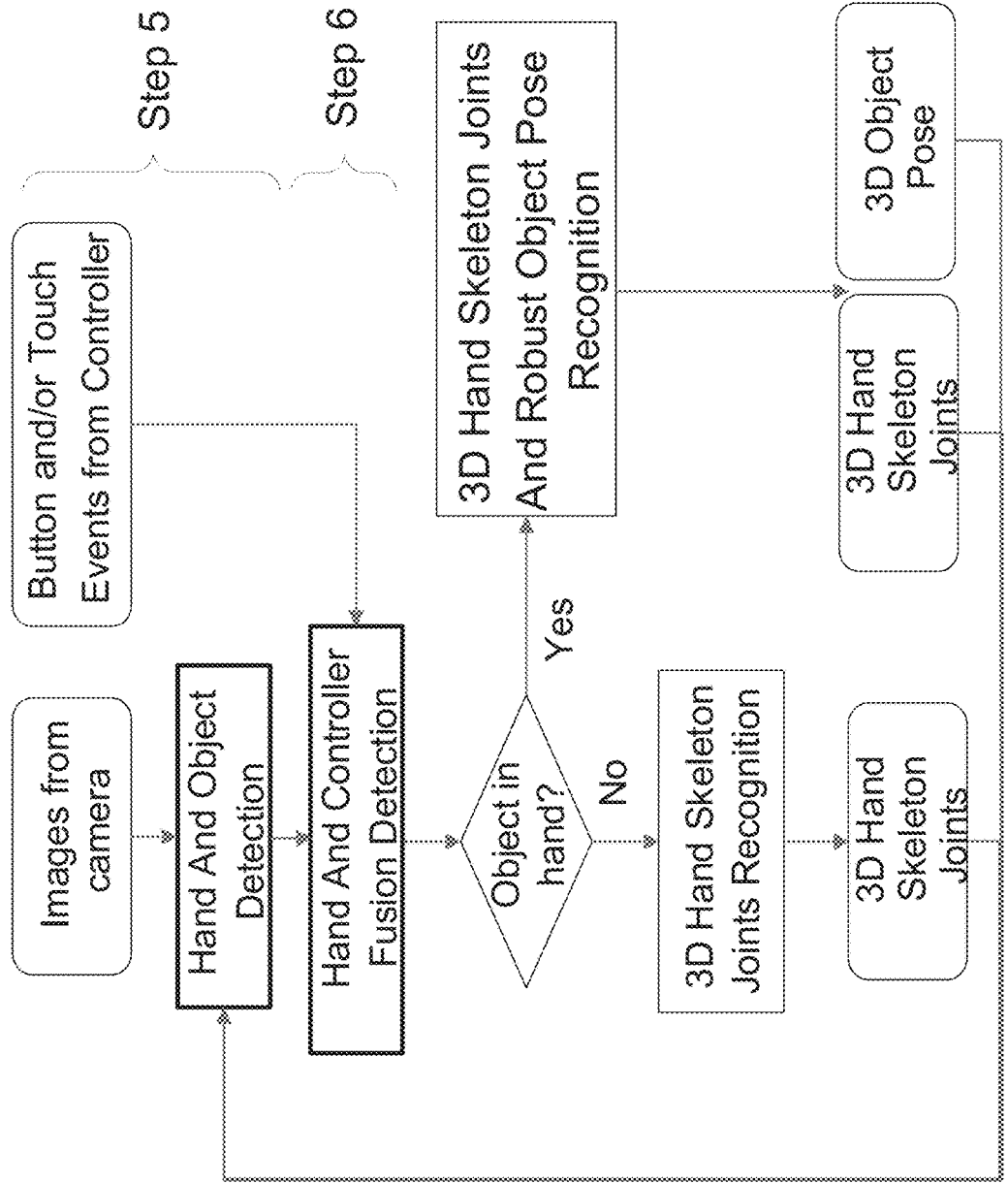
FIG. 7 is a flow diagram illustrating an exemplary method for hand tracking, consistent with exemplary embodiments of the present disclosure.

FIG. 7 is a flow diagram illustrating an exemplary method 700 for hand tracking, consistent with exemplary embodiments of the present disclosure. The method 700 may be implemented by the systems described herein. The method 700 includes a number of steps, some of which may be optional. The method 700 may be referred to as a Visual-Fusion algorithm. The method 700 may be applicable to the hand configurations 112 and 114 of FIG. 1B. In some embodiments, a user may hold a controller (with a button and/or a touch sensor such as touchpad, but no motion sensor such as IMU). That is, the controller may comprise least one of a button or a touch sensor. The button may be configured to sense a button event to provide as active feedback to the head mounted display, the button event comprising pressing the button. The touch sensor may be configured to sense a touch event as active feedback to the head mounted display, the touch event comprising touching the touch sensor.

As shown in FIG. 7, to render the virtual hand resembling the physical hand in the virtual environment for viewing by the user based at least on the images, the system 200/210 may comprise a processor and a non-transitory computer-readable storage medium storing instructions that, when executed by the processor, cause the processor to perform the method 700. The processor and the non-transitory computer-readable storage medium may be comprised in the HMD 103 or in the hand tracking camera module 102. The method 700 may be similar to the method 600 described above, except that (step 1) comprises: (step 5) obtaining the image in the current frame and least one of the determined skeleton joints or the determined 3D object pose in the previous frame as inputs to execute the Hand And Object Detection algorithm, and (step 6) obtaining an output of the Hand And Object Detection algorithm and at least one of the button event or the touch event as inputs to a Hand And Controller Fusion Detection algorithm to determine if the physical hand holds an object in the current frame and determine which hand of the user touches the controller if the touch event is obtained.

In some embodiments, the controller can send button and touchpad status to the HMD 103 and/or the hand tracking camera module 102. The Hand And Object Detection algorithm can detect in the image, for each of the left hand and right hand: (1) if the hand is free of any object, (2) if there is an object in the hand, and (3) the object. Further, the Hand and Controller Fusion Detection algorithm can obtain the controller's status including button press events and touch-pad press and finger movement events to further refine the detection of (1) whether the hand is holding the controller (because if there is a button event or touch pad event, then a hand must be holding this controller), and/or (2) which hand is holding which controller (e.g., by comparing finger movement detected by computer-vision-based 3D skeleton recognition with the button or touch sensor event).

Figure 8:
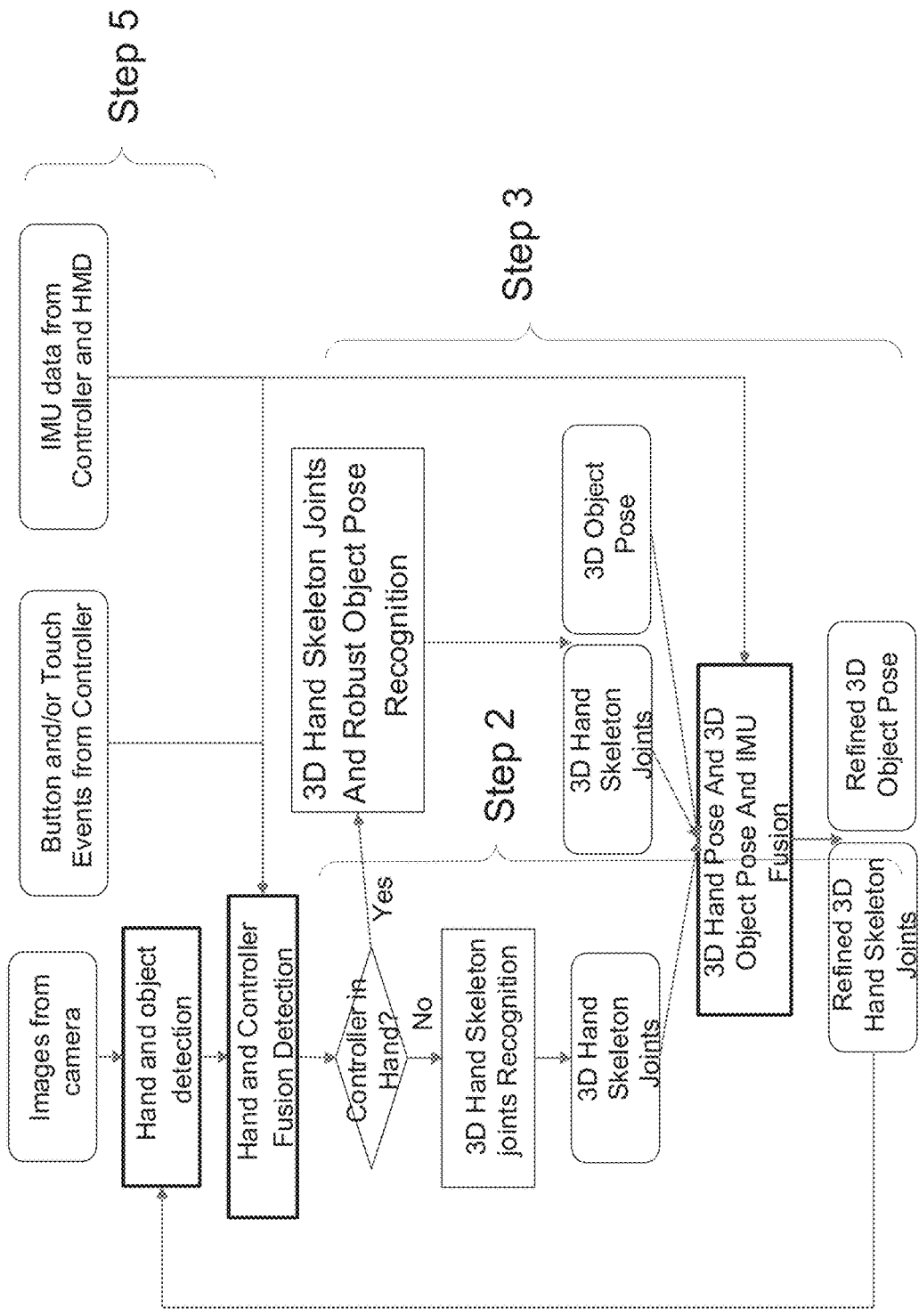
FIG. 8 is a flow diagram illustrating an exemplary method for hand tracking, consistent with exemplary embodiments of the present disclosure.

FIG. 8 is a flow diagram illustrating an exemplary method 800 for hand tracking, consistent with exemplary embodiments of the present disclosure. The method 800 may be implemented by the systems described herein. The method 800 includes a number of steps, some of which may be optional. The method 800 may be referred to as a Visual-Fusion algorithm. The method 800 may be applicable to the hand configurations 112 and 114 of FIG. 1B. In some embodiments, a user may hold a controller (with a button and/or a touchpad and with a motion sensor such as IMU). That is, the head mounted display may comprise an inertial measurement unit (IMU) configured to sense 3D rotations of the head mounted display, and the controller may further comprise another IMU configured to sense 3D rotations of the controller to provide as active feedback to the head mounted display. IMU data comprises the sensed 3D rotations of the head mounted display and the sensed 3D rotations of the controller. With the IMU data, the motion of the hand and controller can be briefly tracked when they are out of camera's field of view.

As shown in FIG. 8, to render the virtual hand resembling the physical hand in the virtual environment for viewing by the user based at least on the images, the system 200/210 may comprise a processor and a non-transitory computer-readable storage medium storing instructions that, when executed by the processor, cause the processor to perform the method 800. The processor and the non-transitory computer-readable storage medium may be comprised in the HMD 103 or in the hand tracking camera module 102. The method 800 may be similar to the method 700 described above, except that (step 5) comprises: obtaining, from the images, an image in a current frame, the IMU data, and least one of determined skeleton joints or a determined 3D object pose in a previous frame as inputs to execute the Hand And Object Detection algorithm; (step 2) comprises, in response to determining that the physical hand holds no object: executing a 3D Hand Skeleton Joints Recognition algorithm to determine 3D skeleton joints of the physical hand in 26 degrees-of-freedom in the current frame, inputting the determined 3D skeleton joints and the IMU date to a 3D Hand Pose And 3D Object Pose And IMU Fusion algorithm to refine the determined 3D skeleton joints and the determined 3D object pose, rendering the virtual hand based at least on the refined 3D skeleton joints, and feedbacking the refined 3D skeleton joints to the Hand And Object Detection algorithm for determining if the physical hand holds any object in a next frame; and (step 3) comprises, in response to determining that the physical hand holds an object: executing a 3D Hand Skeleton Joints And Robust Object Pose Recognition algorithm to determine 3D skeleton joints of the physical hand in 26 degrees-of-freedom and a 3D object pose of the object in the current frame, inputting the determined 3D skeleton joints, the determined 3D object pose, and the IMU date to a 3D Hand Pose And 3D Object Pose And IMU Fusion algorithm to refine the determined 3D skeleton joints and the determined 3D object pose, rendering the virtual hand based at least on the refined 3D skeleton joints, and feedbacking the refined 3D skeleton joints and the refined 3D object pose to the Hand And Object Detection algorithm for determining if the physical hand holds any object in a next frame.

The 3D Hand Pose And 3D Object Pose And IMU Fusion algorithm, and similar algorithms for recognizing and tracking hand poses, object poses, and IMU data can be found in U.S. Pat. Pub. No. 20180046874A1, titled "Method and system for 3d hand skeleton tracking" and U.S. Pat. Pub. No. 20180025540A1, titled "System and method for marker based tracking," the entire contents of all of which are incorporated herein by reference.

In some embodiments, the controllers can send actuator and sensor status to the HMD 103 and/or the hand tracking camera module 102. The Hand And Object Detection algorithm can detect in the image, for each of the left hand and right hand, (1) if the hand is free of any object, (2) if there is an object in the hand, and (3) the object. Furthermore, the Hand and Controller Fusion Detection algorithm also can obtain the controller's IMU information in additional to the button and touchpad information. The Hand and Controller Fusion Detection algorithm can use the IMU information to: (1) refine the detection of whether hand is holding the controller (e.g., if IMU data is static, then the hand is not holding the controller), (2) refine the detection of which hand is holding which controller (e.g., by comparing hand 3D motion result calculated from the computer vision algorithm to the motion data computed by IMU data, which should agree with each other), and/or (3) when hand and controller move out of camera's field of view, use the IMU data to continue tracking the 3D rotation and 3D position of the controller and user's hand.

Figure 9A:
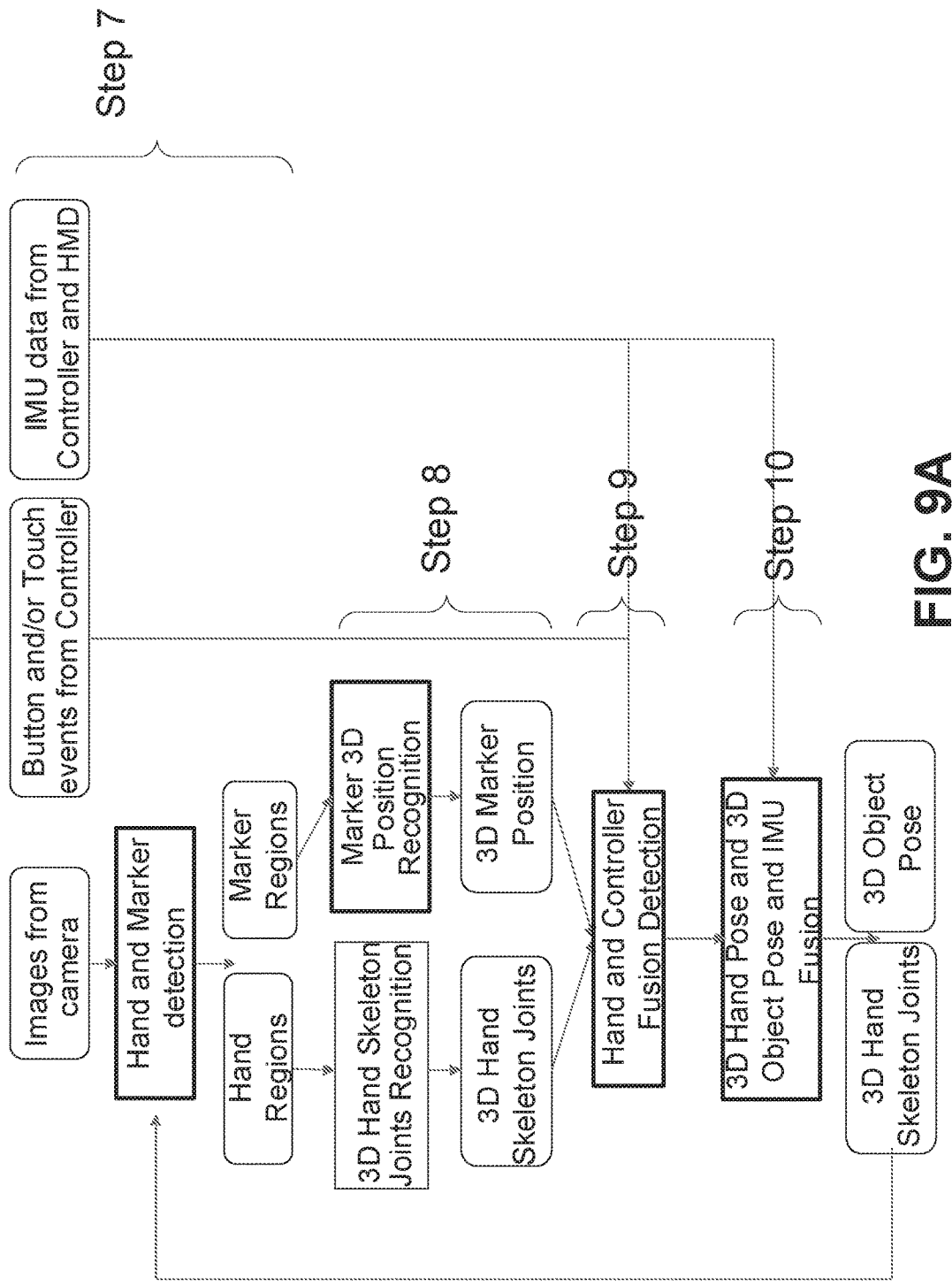
FIGS. 9A-9B are a flow diagram illustrating an exemplary method for hand tracking, consistent with exemplary embodiments of the present disclosure.
Figure 9B:
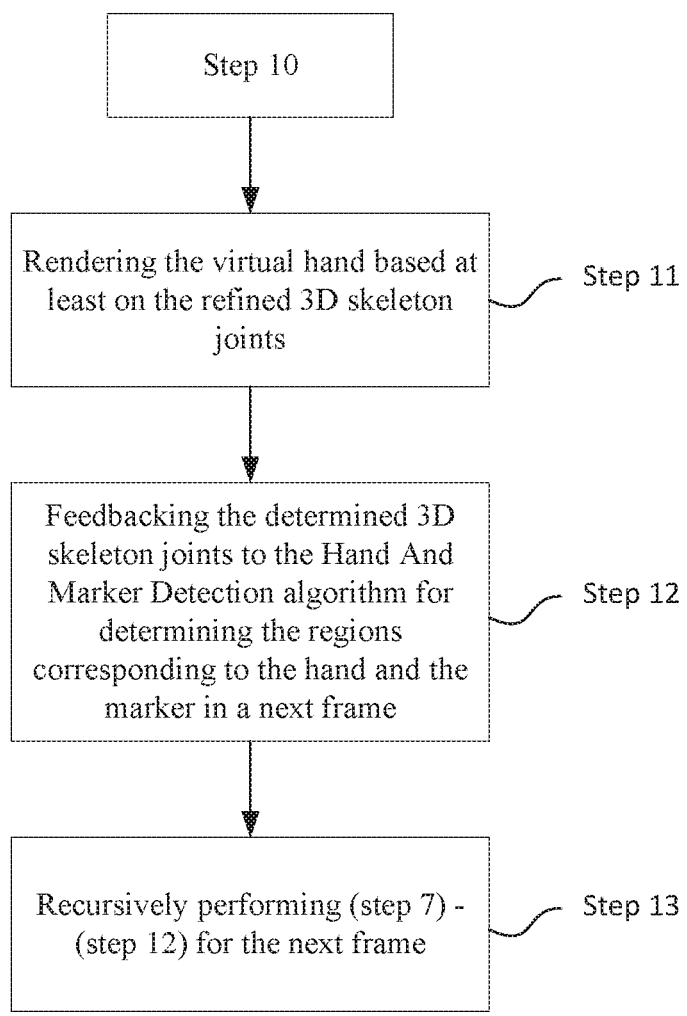
Figure 10:
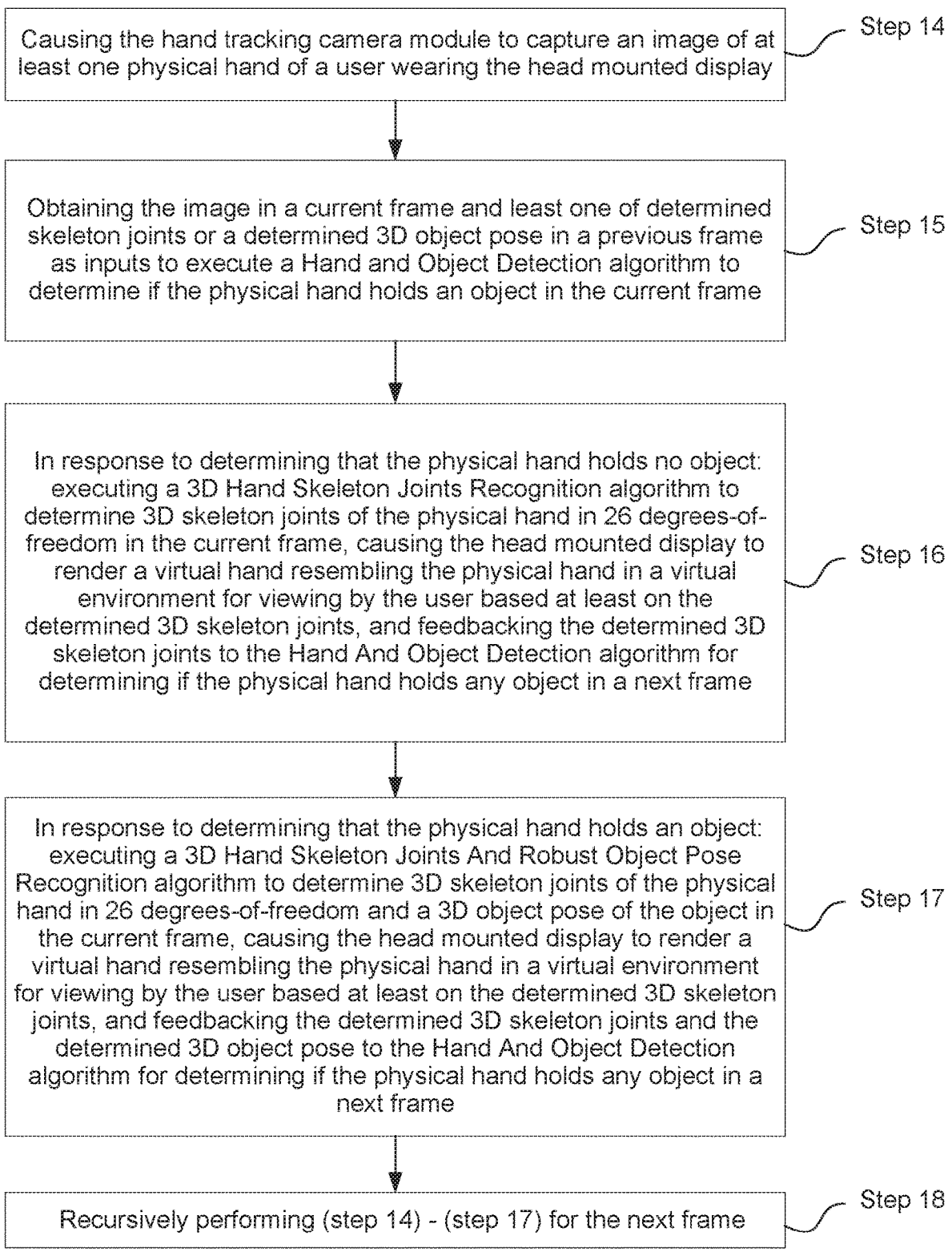
FIG. 10 is a flow diagram illustrating an exemplary method for hand tracking, consistent with exemplary embodiments of the present disclosure.

FIGS. 9A-9B are a flow diagram illustrating an exemplary method 900 for hand tracking, consistent with exemplary embodiments of the present disclosure. The method 900 may be implemented by the systems described herein. The method 900 includes a number of steps, some of which may be optional. The method 900 may be referred to as a Visual-Fusion algorithm. The method 900 may be applicable to the hand configuration 113 of FIG. 1B. In some embodiments, a user may hold a controller (with a button and/or a touch sensor such as touchpad, with a motion sensor such as IMU, and with a marker). The button, touch sensor, and IMU may be similar to the description above. The marker can be passive, made of reflective material, or can be active (e.g., using a light emitter). The marker may be visible or invisible. In some embodiments, the controller may further comprise at least one of a light emitter or a light reflector as a marker. The light emitter may be configured to emitted infrared light as active feedback to the head mounted display. The light reflector may be configured to reflect infrared light emitted by a light emitter comprised in the hand tracking camera module as active feedback to the head mounted display. With the marker, more robust detection of the "hand holding controller" state and more accurate 6DOF pose of the controller and the hand can be achieved. The system can also briefly track the motion of the hand and controller when they are out of camera's field of view.

As shown in FIGS. 9A-9B, to render the virtual hand resembling the physical hand in the virtual environment for viewing by the user based at least on the images, the system 200/210 may comprise a processor and a non-transitory computer-readable storage medium storing instructions that, when executed by the processor, cause the processor to perform the method 900. The processor and the non-transitory computer-readable storage medium may be comprised in the HMD 103 or in the hand tracking camera module 102. The method 900 (step 7) obtaining, from the images, an image in a current frame and determined skeleton joints and a determined 3D object pose in a previous frame as inputs to execute a Hand and Marker Detection algorithm to determine from the image one or more regions corresponding to the physical hand and one or more regions corresponding to the marker; (step 8) executing a 3D Hand Skeleton Joints Recognition algorithm to determine 3D skeleton joints of the physical hand in 26 degrees-of-freedom in the current frame, and executing a Marker 3D Position Recognition algorithm to determine a 3D position of the marker; (step 9) obtaining the determined 3D skeleton joints, the 3D position of the marker, the IMU data, and at least one of the button event or the touch event as inputs to a Hand And Controller Fusion Detection algorithm; (step 10) obtaining an output of the Hand And Controller Fusion Detection algorithm and the IMU data as inputs to a 3D Hand Pose And 3D Object Pose And IMU Fusion algorithm to refine the determined 3D skeleton joints and to determine a 3D object pose; (step 11) rendering the virtual hand based at least on the refined 3D skeleton joints; (step 12) feedbacking the determined 3D skeleton joints to the Hand And Marker Detection algorithm for determining the regions corresponding to the hand and the marker in a next frame; and (step 13) recursively performing (step 7)-(step 12) for the next frame.

In some embodiments, the marker can have a distinctive shape, e.g., a sphere, or a pyramid, etc. If the marker is active and light-emitting, the emitting time window may be synced with the exposure opening time window of the camera sensor. The Hand And Marker Detection algorithm can detect in the image: pixels corresponding to the left hand, right hand, and marker. Then, the Marker 3D Position Recognition algorithm can track and calculate the precise 3D position of each marker. The Hand And Controller Fusion Detection algorithm can (1) associate the 3D position and motion trajectory of the marker with 3D position and motion trajectory of the hand, to determine which marker is held by which hand, and (2) associate a marker with a controller by comparing the motion determined by image with the motion determined by IMU data. The Hand And Controller Fusion Detection algorithm can use information from button, touchpad, and IMU motion data to determine which controller is associated with which hand. The 3D Hand Pose And 3D Object Pose and IMU Fusion algorithm can (1) determine 6DOF object pose (3D position+3D rotation) by fusing 3D position given by marker tracking with 3D rotation given by IMU data, and (2) fuse 6DOF controller pose with 6DOF hand pose to get more accurate 6DOF pose for both the controller and the hand.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. In some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for 3D contour recognition and 3D mesh generation. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A system for hand tracking, comprising:
a head mounted display wearable by a user; and
a hand tracking camera module attached to the head mounted display and comprising at least one of a pair of stereo cameras or a depth camera, wherein:
the hand tracking camera module is configured to capture images of at least one physical hand of the user;
the head mounted display is configured to render a virtual hand resembling the physical hand in a virtual environment for viewing by the user based at least on the images; and
a processor and a non-transitory computer-readable storage medium storing instructions that, when executed by the processor, cause the processor to:
(a) obtain an image in a current frame and at least one of determined skeleton joints or a determined 3D object pose in a previous frame as inputs to execute a Hand and Object Detection algorithm to determine if the physical hand holds an object in the current frame;
(b) in response to determining that the physical hand holds no object:
execute a 3D Hand Skeleton Joints Recognition algorithm to determine 3D skeleton joints of the physical hand in 26 degrees-of-freedom in the current frame,
render the virtual hand based at least on the determined 3D skeleton joints, and
feedback the determined 3D skeleton joints to the Hand And Object Detection algorithm for determining if the physical hand holds any object in a next frame;
(c) in response to determining that the physical hand holds an object:
execute a 3D Hand Skeleton Joints And Robust Object Pose Recognition algorithm to determine 3D skeleton joints of the physical hand in 26 degrees-of-freedom and a 3D object pose of the object in the current frame,
render the virtual hand based at least on the determined 3D skeleton joints, and
feedback the determined 3D skeleton joints and the determined 3D object pose to the Hand And Object Detection algorithm for determining if the physical hand holds any object in a next frame; and
(d) recursively perform (a)-(c) for the next frame.

2. The system of claim 1, wherein the at least one physical hand is bare-handed.

3. The system of claim 1, wherein:
the at least one physical hand holds a physical object;
the physical object is incapable of providing active feedback to the system; and
the head mounted display is further configured to render a virtual object resembling the physical object, the virtual object held by the virtual hand in the virtual environment.

4. The system of claim 1, wherein the processor and the non-transitory computer-readable storage medium are comprised in the head mounted display.

5. The system of claim 1, wherein the processor and the non-transitory computer-readable storage medium are comprised in the hand tracking camera module.

6. The system of claim 1, further comprising a controller held or worn by the physical hand, wherein:
the controller comprises at least one of a button or a touch sensor;
the button is configured to sense a button event to provide as active feedback to the head mounted display, the button event comprising pressing the button;
the touch sensor is configured to sense a touch event as active feedback to the head mounted display, the touch event comprising touching the touch sensor; and
(a) comprises:
(e) obtain the image in the current frame and at least one of the determined skeleton joints or the determined 3D object pose in the previous frame as inputs to execute the Hand And Object Detection algorithm, and
(f) obtain an output of the Hand And Object Detection algorithm and at least one of the button event or the touch event as inputs to a Hand And Controller Fusion Detection algorithm to determine if the physical hand holds an object in the current frame and determine which hand of the user touches the controller if the touch event is obtained.

7. The system of claim 6, wherein:
the head mounted display comprises an inertial measurement unit (IMU) configured to sense 3D rotations of the head mounted display;
the controller further comprises another IMU configured to sense 3D rotations of the controller to provide as active feedback to the head mounted display;
IMU data comprises the sensed 3D rotations of the head mounted display and the sensed 3D rotations of the controller;
(b) comprises, in response to determining that the physical hand holds no object:
execute a 3D Hand Skeleton Joints Recognition algorithm to determine 3D skeleton joints of the physical hand in 26 degrees-of-freedom in the current frame, input the determined 3D skeleton joints and the IMU data to a 3D Hand Pose And 3D Object Pose And IMU Fusion algorithm to refine the determined 3D skeleton joints and the determined 3D object pose, render the virtual hand based at least on the refined 3D skeleton joints, and feedback the refined 3D skeleton joints to the Hand And Object Detection algorithm for determining if the physical hand holds any object in a next frame;

(c) comprises, in response to determining that the physical hand holds an object:

execute a 3D Hand Skeleton Joints And Robust Object Pose Recognition algorithm to determine 3D skeleton joints of the physical hand in 26 degrees-of-freedom and a 3D object pose of the object in the current frame, input the determined 3D skeleton joints, the determined 3D object pose, and the IMU data to a 3D Hand Pose And 3D Object Pose And IMU Fusion algorithm to refine the determined 3D skeleton joints and the determined 3D object pose, render the virtual hand based at least on the refined 3D skeleton joints, and feedback the refined 3D skeleton joints and the refined 3D object pose to the Hand And Object Detection algorithm for determining if the physical hand holds any object in a next frame; and (e) comprises: obtain an image in a current frame, the IMU data, and at least one of determined skeleton joints or a determined 3D object pose in a previous frame as inputs to execute the Hand And Object Detection algorithm.

8. The system of claim 1, further comprising a controller held or worn by the physical hand, wherein:

the controller comprises at least one of a button or a touch sensor;

the button is configured to sense a button event to provide as active feedback to the head mounted display, the button event comprising pressing the button;

the touch sensor is configured to sense a touch event as active feedback to the head mounted display, the touch event comprising touching the touch sensor;

the head mounted display comprises an inertial measurement unit (IMU) configured to sense 3D rotations of the head mounted display;

the controller further comprises another IMU configured to sense 3D rotations of the controller to provide as active feedback to the head mounted display;

IMU data comprises the sensed 3D rotations of the head mounted display and the sensed 3D rotations of the controller;

the controller further comprises at least one of a light emitter or a light reflector as a marker;

the light emitter is configured to emit infrared light as active feedback to the head mounted display; and the light reflector is configured to reflect infrared light emitted by a light emitter comprised in the hand tracking camera module as active feedback to the head mounted display.

9. The system of claim 8, wherein: to render the virtual hand resembling the physical hand in the virtual environment for viewing by the user based at least on the images, the system comprises a processor and a non-transitory computer-readable storage medium storing instructions that, when executed by the processor, cause the processor to:

(g) obtain an image in a current frame and determined skeleton joints and a determined 3D object pose in a previous frame as inputs to execute a Hand and Marker Detection algorithm to determine from the image one or more regions corresponding to the physical hand and one or more regions corresponding to the marker;

(h) execute a 3D Hand Skeleton Joints Recognition algorithm to determine 3D skeleton joints of the physical hand in 26 degrees-of-freedom in the current frame, and executing a Marker 3D Position Recognition algorithm to determine a 3D position of the marker;

(i) obtain the determined 3D skeleton joints, the 3D position of the marker, the IMU data, and at least one of the button event or the touch event as inputs to a Hand And Controller Fusion Detection algorithm;

(j) obtain an output of the Hand And Controller Fusion Detection algorithm and the IMU data as inputs to a 3D Hand Pose And 3D Object Pose And IMU Fusion algorithm to refine the determined 3D skeleton joints and to determine a 3D object pose;

(k) render the virtual hand based at least on the refined 3D skeleton joints;

(l) feedback the determined 3D skeleton joints to the Hand And Marker Detection algorithm for determining the regions corresponding to the hand and the marker in a next frame; and (m) recursively perform (g)-(l) for the next frame.

10. A method for hand tracking, comprising:

capturing, by a hand tracking camera module, images of at least one physical hand of a user; and rendering, by a head mounted display wearable by a user, a virtual hand resembling the physical hand in a virtual environment for viewing by the user based at least on the images, wherein the hand tracking camera module is attached to the head mounted display and comprises at least one of a pair of stereo cameras or a depth camera; and wherein rendering the virtual hand resembling the physical hand in the virtual environment for viewing by the user comprises:

(a) obtaining an image in a current frame and at least one of determined skeleton joints or a determined 3D object pose in a previous frame as inputs to execute a Hand and Object Detection algorithm to determine if the physical hand holds an object in the current frame;

(b) in response to determining that the physical hand holds no object:

executing a 3D Hand Skeleton Joints Recognition algorithm to determine 3D skeleton joints of the physical hand in 26 degrees-of-freedom in the current frame, rendering the virtual hand based at least on the determined 3D skeleton joints, and feedbacking the determined 3D skeleton joints to the Hand And Object Detection algorithm for determining if the physical hand holds any object in a next frame;

(c) in response to determining that the physical hand holds an object:

executing a 3D Hand Skeleton Joints And Robust Object Pose Recognition algorithm to determine 3D skeleton joints of the physical hand in 26 degrees-of-freedom and a 3D object pose of the object in the current frame, rendering the virtual hand based at least on the determined 3D skeleton joints, and feedbacking the determined 3D skeleton joints and the determined 3D object pose to the Hand And Object Detection algorithm for determining if the physical hand holds any object in a next frame; and (d) recursively performing (a)-(c) for the next frame.

11. The method of claim 10, wherein the at least one physical hand is bare-handed.

12. The method of claim 10, wherein:
the at least one physical hand holds a physical object;
the physical object is incapable of providing active feedback; and
the method further comprises rendering, by the head mounted display, a virtual object resembling the physical object, the virtual object held by the virtual hand in the virtual environment.

13. The method of claim 10, wherein:
the physical hand holds or wears a controller;
the controller comprises at least one of a button or a touch sensor;
the button is configured to sense a button event to provide as active feedback to the head mounted display, the button event comprising pressing the button;
the touch sensor is configured to sense a touch event as active feedback to the head mounted display, the touch event comprising touching the touch sensor; and
(a) comprises:
  (e) obtaining the image in a current frame and at least one of the determined skeleton joints or the determined 3D object pose in the previous frame as inputs to execute the Hand And Object Detection algorithm, and
  (f) obtaining an output of the Hand And Object Detection algorithm and at least one of the button event or the touch event as inputs to a Hand And Controller Fusion Detection algorithm to determine if the physical hand holds an object in the current frame and determine which hand of the user touches the controller if the touch event is obtained.

14. The method of claim 13, wherein:
the head mounted display comprises an inertial measurement unit (IMU) configured to sense 3D rotations of the head mounted display;
the controller further comprises another IMU configured to sense 3D rotations of the controller to provide as active feedback to the head mounted display;
IMU data comprises the sensed 3D rotations of the head mounted display and the sensed 3D rotations of the controller;
(b) comprises, in response to determining that the physical hand holds no object:
  executing a 3D Hand Skeleton Joints Recognition algorithm to determine 3D skeleton joints of the physical hand in 26 degrees-of-freedom in the current frame,
    inputting the determined 3D skeleton joints and the IMU data to a 3D Hand Pose And 3D Object Pose And IMU Fusion algorithm to refine the determined 3D skeleton joints and the determined 3D object pose,
  rendering the virtual hand based at least on the refined 3D skeleton joints, and
  feedbacking the refined 3D skeleton joints to the Hand And Object Detection algorithm for determining if the physical hand holds any object in a next frame;
(c) comprises, in response to determining that the physical hand holds an object:
  executing a 3D Hand Skeleton Joints And Robust Object Pose Recognition algorithm to determine 3D skeleton joints of the physical hand in 26 degrees-of-freedom and a 3D object pose of the object in the current frame,
    inputting the determined 3D skeleton joints, the determined 3D object pose, and the IMU data to a 3D Hand Pose And 3D Object Pose And IMU Fusion algorithm to refine the determined 3D skeleton joints and the determined 3D object pose,
  rendering the virtual hand based at least on the refined 3D skeleton joints, and
  feedbacking the refined 3D skeleton joints and the refined 3D object pose to the Hand And Object Detection algorithm for determining if the physical hand holds any object in a next frame; and
(e) comprises: obtaining an image in a current frame, the IMU data, and at least one of determined skeleton joints or a determined 3D object pose in a previous frame as inputs to execute the Hand And Object Detection algorithm.

15. The method of claim 10, wherein:
the physical hand holds or wears a controller;
the controller comprises at least one of a button or a touch sensor;
the button is configured to sense a button event to provide as active feedback to the head mounted display, the button event comprising pressing the button;
the touch sensor is configured to sense a touch event as active feedback to the head mounted display, the touch event comprising touching the touch sensor;
the head mounted display comprises an inertial measurement unit (IMU) configured to sense 3D rotations of the head mounted display;
the controller further comprises another IMU configured to sense 3D rotations of the controller to provide as active feedback to the head mounted display;
IMU data comprises the sensed 3D rotations of the head mounted display and the sensed 3D rotations of the controller;
the controller further comprises at least one of a light emitter or a light reflector as a marker;
the light emitter is configured to emit infrared light as active feedback to the head mounted display; and
the light reflector is configured to reflect infrared light emitted by a light emitter comprised in the hand tracking camera module as active feedback to the head mounted display.

16. The method of claim 15, wherein: to render the virtual hand resembling the physical hand in the virtual environment for viewing by the user based at least on the images, the method further comprises:
(g) obtaining an image in a current frame and determined skeleton joints and a determined 3D object pose in a previous frame as inputs to execute a Hand and Marker Detection algorithm to determine from the image one or more regions corresponding to the physical hand and one or more regions corresponding to the marker;
(h) executing a 3D Hand Skeleton Joints Recognition algorithm to determine 3D skeleton joints of the physical hand in 26 degrees-of-freedom in the current frame, and executing a Marker 3D Position Recognition algorithm to determine a 3D position of the marker;
(i) obtaining the determined 3D skeleton joints, the 3D position of the marker, the IMU data, and at least one of the button event or the touch event as inputs to a Hand And Controller Fusion Detection algorithm;
(j) obtaining an output of the Hand And Controller Fusion Detection algorithm and the IMU data as inputs to a 3D Hand Pose And 3D Object Pose And IMU Fusion algorithm to refine the determined 3D skeleton joints and to determine a 3D object pose;

(k) rendering the virtual hand based at least on the refined 3D skeleton joints;

(l) feedbacking the determined 3D skeleton joints to the Hand And Marker Detection algorithm for determining the regions corresponding to the hand and the marker in a next frame; and (m) recursively performing (g)-(l) for the next frame.

17. An apparatus for hand tracking, comprising:
a head mounted display;
a hand tracking camera module attached to the head mounted display and comprising at least one of a pair of stereo cameras or a depth camera;
a processor; and
a non-transitory computer-readable storage medium storing instructions that, when executed by the processor, cause the processor to:
(n) cause the hand tracking camera module to capture an image of at least one physical hand of a user wearing the head mounted display;
(o) obtain the image in a current frame and at least one of determined skeleton joints or a determined 3D object pose in a previous frame as inputs to execute a Hand and Object Detection algorithm to determine if the physical hand holds an object in the current frame;
(p) in response to determining that the physical hand holds no object:
execute a 3D Hand Skeleton Joints Recognition algorithm to determine 3D skeleton joints of the physical hand in 26 degrees-of-freedom in the current frame,
cause the head mounted display to render a virtual hand resembling the physical hand in a virtual environment for viewing by the user based at least on the determined 3D skeleton joints, and
feedback the determined 3D skeleton joints to the Hand And Object Detection algorithm for determining if the physical hand holds any object in a next frame;

(q) in response to determining that the physical hand holds an object:
execute a 3D Hand Skeleton Joints And Robust Object Pose Recognition algorithm to determine 3D skeleton joints of the physical hand in 26 degrees-of-freedom and a 3D object pose of the object in the current frame,
cause the head mounted display to render a virtual hand resembling the physical hand in a virtual environment for viewing by the user based at least on the determined 3D skeleton joints, and
feedback the determined 3D skeleton joints and the determined 3D object pose to the Hand And Object Detection algorithm for determining if the physical hand holds any object in a next frame; and (r) recursively perform (n)-(q) for the next frame.

18. The apparatus of claim 17, further comprising a controller held or worn by the physical hand, wherein:
the controller comprises at least one of a button or a touch sensor;
the button is configured to sense a button event to provide as active feedback to the head mounted display, the button event comprising pressing the button;
the touch sensor is configured to sense a touch event as active feedback to the head mounted display, the touch event comprising touching the touch sensor; and
(o) comprises:
(s) obtain the image in the current frame and at least one of the determined skeleton joints or the determined 3D object pose in the previous frame as inputs to execute the Hand And Object Detection algorithm, and
(t) obtain an output of the Hand And Object Detection algorithm and at least one of the button event or the touch event as inputs to a Hand And Controller Fusion Detection algorithm to determine if the physical hand holds an object in the current frame and determine which hand of the user touches the controller if the touch event is obtained.

* * * * *